United States Patent [19]

Meyer

[11] Patent Number: 5,257,646
[45] Date of Patent: Nov. 2, 1993

[54] O-RING DAMPED REGULATOR

[75] Inventor: Larry P. Meyer, Walla Walla, Wash.

[73] Assignee: Nelson Irrigation Corporation, Walla Walla, Wash.

[21] Appl. No.: 929,922

[22] Filed: Aug. 17, 1992

[51] Int. Cl.⁵ ............................................. G05D 16/02
[52] U.S. Cl. ................................... 137/505.25; 251/50
[58] Field of Search ................... 137/505.25; 251/48, 251/50

[56] References Cited

U.S. PATENT DOCUMENTS

| | | | |
|---|---|---|---|
| 2,254,253 | 9/1941 | Williams | 251/50 X |
| 3,730,226 | 5/1973 | Nelson | 251/48 X |
| 4,481,969 | 11/1984 | Fallon et al. | 137/505.25 X |
| 4,543,985 | 10/1985 | Healy et al. | 137/505.25 |
| 4,620,562 | 11/1986 | Pacht | 137/315 |
| 4,655,248 | 4/1987 | Chalaire | 137/528 |
| 4,673,000 | 6/1987 | Haerr et al. | 137/860 |
| 4,796,858 | 1/1989 | Kabel | 251/171 |
| 4,938,376 | 7/1990 | Fieseler et al. | 220/203 |
| 5,065,789 | 11/1991 | Eslinger | 137/513.5 |

Primary Examiner—Stephen M. Hepperle
Attorney, Agent, or Firm—Nixon & Vanderhye

[57] ABSTRACT

A flow through fluid pressure regulator includes a spring biased plunger which is normally biased away from a plunger seat in the direction of fluid flow to provide maximum flow under normal conditions. In the event of a pressure surge, the movement of the plunger in the opposite direction to decrease flow is controlled by a damper. Specifically, the plunger is formed with a radially outwardly facing groove or damper chamber at its downstream end, and into which a resilient O-ring is loosely fitted. This downstream end of the plunger moves within a reduced diameter bore portion of the regulator housing which, in turn, communicates with a diaphragm chamber formed in a larger diameter portion of the housing. The diaphragm chamber surrounds the plunger and is further defined by a flexible diaphragm fixed at an inner radial edge to the plunger and at an outer radial edge to a stationary sleeve in the housing. The outer diameters of the radially outwardly extending flanges which form the O-ring groove or damper chamber, and the loose fit of the O-ring within the groove, permit water to flow past the groove and into the diaphragm chamber in a controlled manner. In an alternative arrangement, the damper chamber and O-ring are located in the housing surrounding the plunger.

24 Claims, 3 Drawing Sheets

O-RING DAMPED REGULATOR

BACKGROUND AND SUMMARY OF THE INVENTION

This invention relates to fluid pressure regulators generally, and specifically to an O-ring damped fluid pressure regulator, particularly, suited for (but not limited to) use in agricultural irrigation systems.

It is well known to use fluid pressure regulators in irrigation systems in order to provide constant outlet pressure over a wide range of inlet pressures. The need for such regulators is particularly acute in low pressure systems because a slight variation in pressure along a system operating at low pressure causes a much greater variation and discharge than the same system operating at high pressure.

The assignee of this invention currently manufactures and sells a fluid pressure regulator of the flow through type, having an inlet at one end of the tubular housing and an outlet at the other end of the tubular housing. A plunger seat is fixed within the housing and is adapted to be engaged by a tubular plunger which is spring biased away from the seat (in the direction of fluid flow) so that under normal conditions, maximum flow through the regulator is permitted. In the event of a pressure surge, the plunger is moved by back pressure within a diaphragm chamber against the action of the spring (and against atmospheric pressure), toward the regulator seat to thereby decrease the flow through the regulator until the pressure is reduced, and the plunger returns to its wide open normal position under the influence of the spring.

The above-described regulator has experienced "chatter", or excessive vibration, when a rapid and high pressure surge is experienced. More specifically, sudden flow into (and then out of) the diaphragm chamber causes rapid reciprocation of the plunger which creates excessive vibration within the regulator, and which may cause damage to the internal components of the regulator.

The present invention incorporates an O-ring or other suitably shaped resilient ring and an associated bleed groove arrangement at the downstream end of the plunger, which serves as a damper by restricting the rapid flow of liquid, e.g., water, into and out of the diaphragm chamber, thereby preventing undesirable chatter and potential damage to the regulator.

In a first exemplary embodiment of the invention, the objective is achieved by forming the plunger with a radially outwardly facing groove or damper chamber at its downstream end, and into which a resilient ring (such as an O-ring) is loosely fitted. This downstream end of the plunger moves within a reduced diameter bore portion of the regulator housing which, in turn, communicates with a diaphragm chamber formed in a larger diameter portion of the housing. The diaphragm chamber surrounds the plunger and is further defined by a flexible diaphragm fixed at an inner radial edge to the plunger and at an outer radial edge to a stationary sleeve in the housing. The outer diameters of the radially outwardly extending flanges which form the O-ring groove or damper chamber, and the loose fit of the O-ring within the groove, permit water to flow past the groove and into the diaphragm chamber. When a pressure surge is experienced by a regulator, fluid pressure builds up in an upstream direction, causing the plunger to move toward the seat to reduce flow in the inlet portion of the regulator. During this time, the O-ring expands outwardly in the same upstream direction to momentarily seal against the entry of additional water into the diaphragm chamber. An axial bleed groove is provided in the bore of the downstream section of the tubular regulator housing, however, which communicates between the outlet end of the regulator and the damper chamber so that liquid may bleed out of the damper chamber and thus prevent a hydraulic lock. Upon subsequent decrease in pressure, movement of the plunger away from the seat in a downstream direction causes fluid to be expelled from the diaphragm chamber as well as the damper chamber, causing the O-ring to expand outwardly in the downstream direction to momentarily seal against the exit of additional water out of the damper chamber. In this way, regulation of fluid flow and consequent movement of the plunger takes place slowly, in a damped manner.

In an alternative embodiment of the invention, the groove and O-ring are fitted within an annular groove formed in the housing bore, rather than in the plunger, and the axial bleed groove is formed in the plunger, but the device otherwise functions in the same manner.

Thus, in its broader aspects, the present invention provides a fluid pressure regulator comprising:
- a tubular housing having a fluid inlet at one end thereof and a fluid outlet at an opposite end and a first through passageway therebetween;
- an open-ended tubular plunger mounted for reciprocal movement in the first fluid passage of the housing, the plunger having a flow control end and a piston end, said piston end having a piston surface and a flexible diaphragm extending radially between said piston surface and said housing;
- a seat in the through passageway including a seating surface located axially upstream of the plunger and adapted to be engaged by said flow control end of the plunger; and
- a damper downstream of the piston end of the plunger, the damper including a resilient ring located in a damper chamber communicating with said fluid outlet.

In another aspect, the invention provides a fluid pressure regulator comprising a housing, a plunger slidable in the housing, a seat adjacent one end of the plunger and a diaphragm chamber adjacent the other end of the plunger, the diaphragm chamber being defined in part by the other end of the housing, another end of the plunger and a diaphragm connected therebetween, the improvement comprising a damper chamber at the other end of the plunger, the damper chamber having a damper element therein for regulating flow into and out of the diaphragm chamber.

In still another aspect, the invention provides a fluid pressure regulator comprising a housing having a first fluid passageway extending through the housing from an inlet end thereof to an outlet end thereof; and annular seat in the housing; a tubular plunger having a flow control end, the plunger adapted to move toward and away from the seat, a variable flow regulating passage being defined by the flow control end and the seat; biasing means for exerting force on the plunger in a direction away from the seat; a diaphragm chamber located toward an end of the plunger opposite the flow control end, the diaphragm chamber adapted to receive fluid under pressure to thereby act on the plunger so as to move the plunger toward the seat as a function of fluid pressure in the outlet end of the housing; and, a resilient damper element within the damper chamber for damping fluid flowing into and out of the diaphragm chamber.

Other objects and advantages of the fluid pressure regulator in accordance with the invention will become apparent from the detailed description which follows.

DETAILED DESCRIPTION OF THE DRAWINGS

Figure 1:
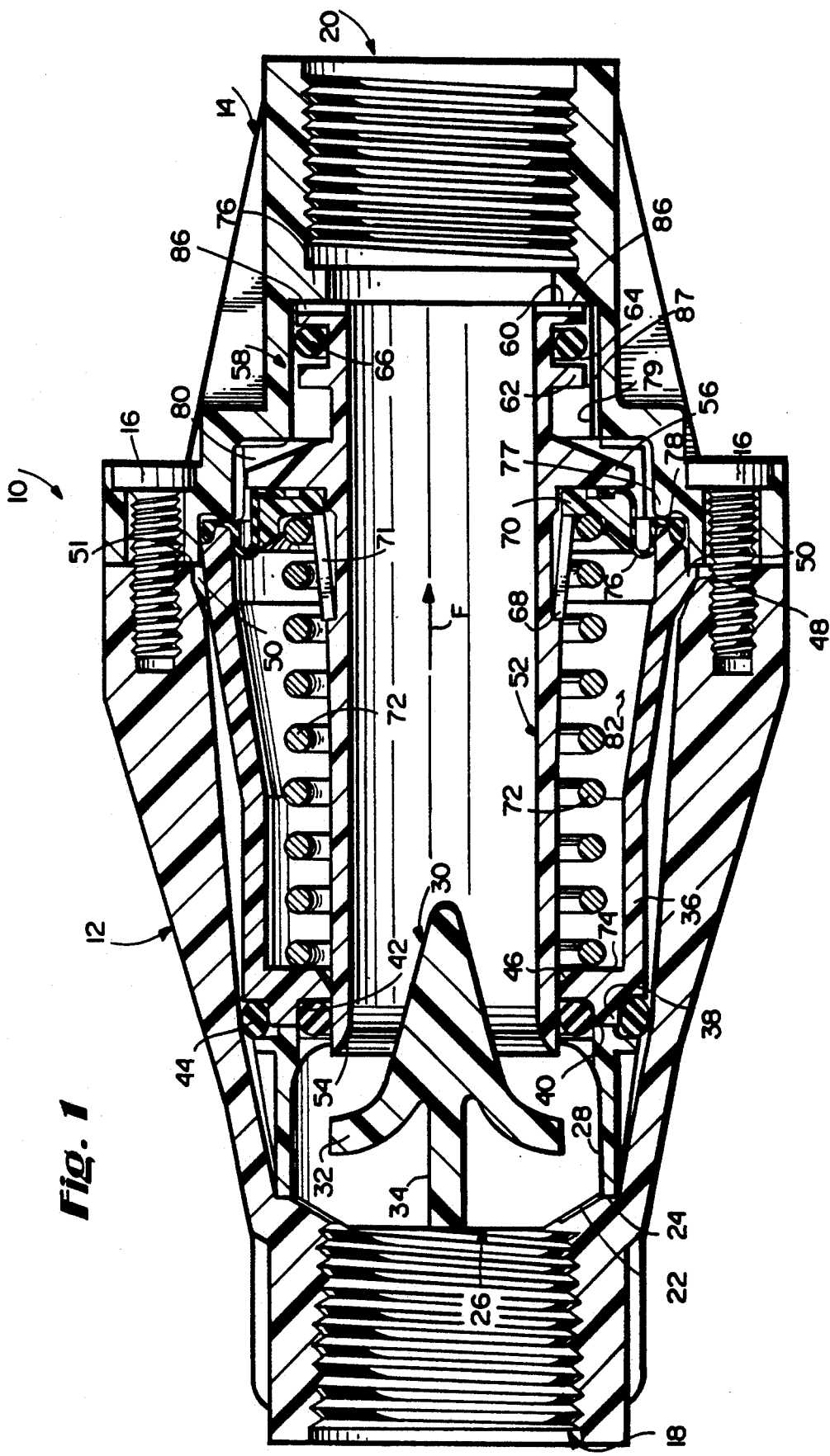
FIG. 1 is a cross section of a fluid pressure regulator in accordance with an exemplary embodiment of the invention.
Figure 2:
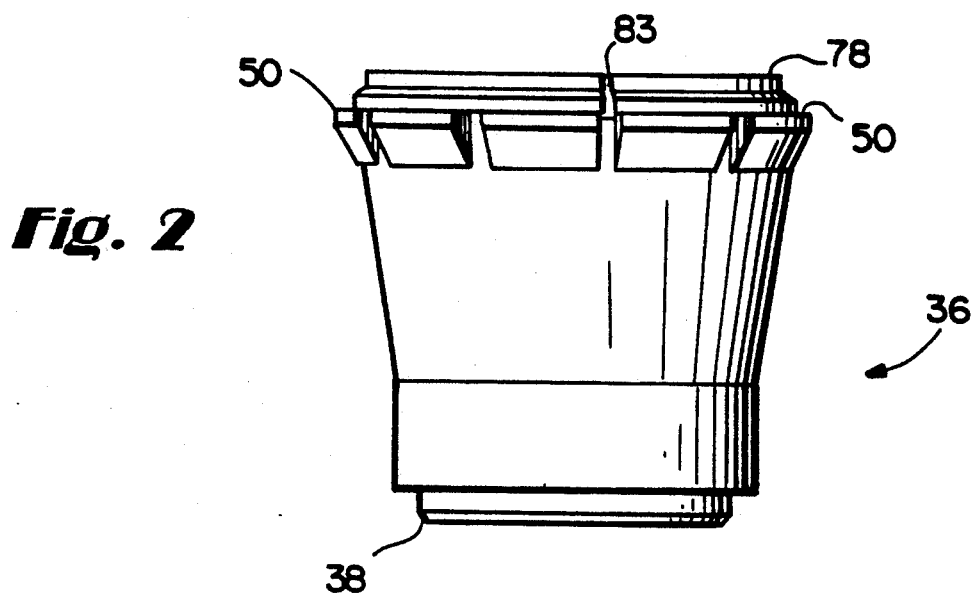
FIG. 2 is a side view of an inner sleeve component of the regulator illustrated in FIG. 1.
Figure 3:
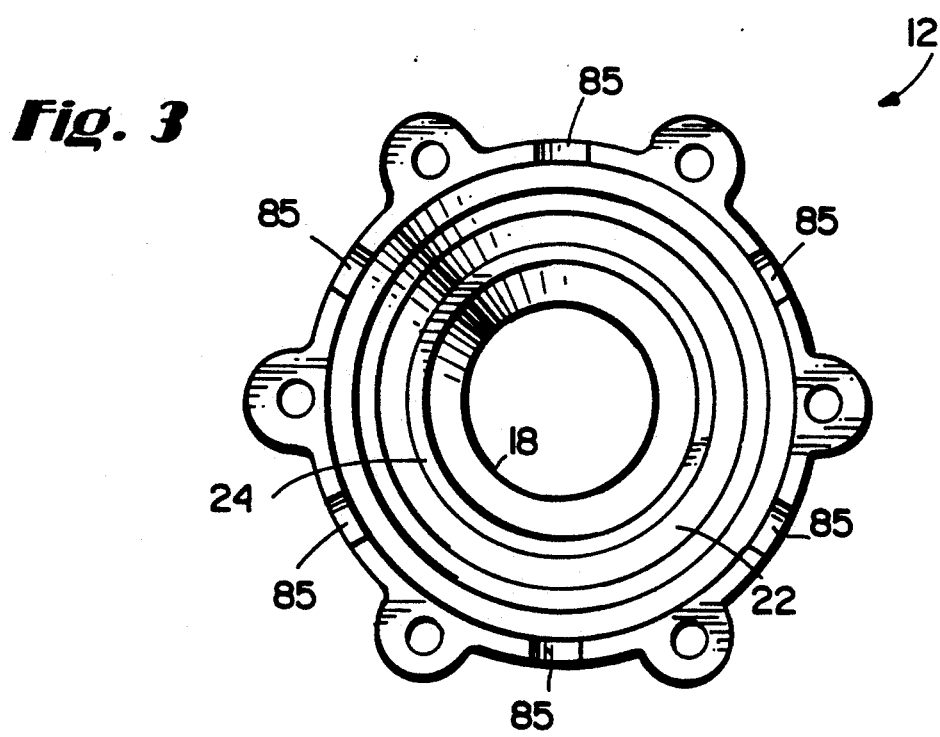
FIG. 3 is a plan view of the lower housing component of the regulator illustrated in FIG. 1.

With reference to FIGS. 1-3, a fluid pressure regulator 10 in accordance with an exemplary embodiment of this invention is shown to include a tubular housing including an upstream or inlet section 12 and a downstream or outlet section 14 secured together by means of fasteners such as screws 16. As will be appreciated from FIG. 1, the flow regulator 10 is of the flow-through type, with an inlet 18 provided at one end of upstream housing section 12, and an outlet 20 provided at the distal end of the downstream section 14. It will further be appreciated that the inlet portion 18 of the regulator may be threaded internally or externally in any of a number of thread configurations and sizes to facilitate attachment to variously sized hoses or other conduits. The outlet portion 20 is interiorly threaded (but could be exteriorly threaded), and is adapted to receive in a typical arrangement, a rotary impact type sprinkler, a fixed spray head, or other sprinkler device.

Within the upstream section 12 of the regulator housing, and adjacent the inlet 18, the interior thereof is formed with an annular tapered surface 22 and an adjacent annular shoulder 24. These surfaces are designed to receive a replaceable, plastic regulator seat 26 which includes an annular outer wall 28 and a conical center portion 30 which terminates rearwardly (i.e., in the upstream direction) in an annular seat surface 32. The central conical portion 30 is connected radially to the annular outer wall 28 by means of a plurality of webs 34. The seat 26 is held securely within the regulator housing by means of a tubular liner or sleeve 36 (best seen in FIG. 2) formed at its lowermost end with an annular ring 38 which is adapted to bear on the uppermost edge 40 of the seat 26. On either side of the annular ring 38, there are seated a pair of inner and outer 0-rings 42, 44, respectively, which insure that fluid flowing through the regulator, in the direction from inlet 18 to outlet 20 as indicated by the flow arrow F, is constrained to flow through the seat 26 and plunger as described below. The upstream end of the sleeve or liner 36 is also provided with a radially inwardmost diameter 46 (FIG. 1) through which the regulator plunger reciprocates as also described in greater detail further herein.

The downstream end 48 of the sleeve or liner 36 is formed with a plurality of radially outer shoulders 50 which are adapted to receive a radially inner edge 51 of the downstream section 14 of the housing when the downstream section 14 is fastened to the upstream section 16. In other words, upon assembly of the downstream section 14 to the upstream section 16, the sleeve 36 and seat 26 are firmly clamped between the shoulder 50 of the downstream section 14 and edge 51 of the upstream section 12.

As indicated earlier, the regulator plunger, shown at 52, slides or reciprocates within the opening defined by the radially inner edge 46 of the sleeve 36. The outer peripheral surface of the plunger 52 engages O-ring 42 as it slides toward and away from the plunger seat surface 32. One end (i.e., the upstream end) of the plunger 52 is formed with a tapered edge 54 to insure precise contact with the seat 32. The other (or downstream) end of the plunger is formed with a radially outwardly extending piston-like surface 56 and terminates at its free, downstream end in a double radial flange configuration generally designated at 58. The latter includes radial flanges 60 and 62 which together form an annular groove or damper chamber 64 in which is relatively loosely seated a resilient ring 66. Ring 66 may be a conventional O-ring but may have other cross-sectional shapes, e.g., square, as well.

Between the lower surface of piston 56 and an annular shoulder 68 formed in the exterior surface of the plunger 52, there is seated a spring retainer 70 which holds a coil spring 72 in compression between the retainer 70 and the lower surface 74 of the sleeve 36. The retainer is an annular member having a plurality of split spring fingers 71 which enable the retainer to be locked to the plunger 52 by sliding the retainer on the upstream end of the plunger toward the downstream end until fingers 71 spring or snap into locking engagement with the annular shoulder 68 on the plunger 52.

A flexible diaphragm 76 is clamped at one end between the retainer 70 and piston 56 and at the other end between an annular ring 77 (depending from the downstream section 14 of the housing) and the downstream end 78 of the sleeve or liner 36.

It will thus be appreciated that the plunger 52 is slidable within the regulator from the position shown in FIG. 1 to a second position where the lower edge 54 of the plunger is seated on surface 32 of seat 26. It will be appreciated that during such movement, the volume of diaphragm chamber 80 is enlarged, while during movement back to the first position shown in FIG. 1, the volume chamber 80 is reduced. At all times, however, the upstream end of the chamber 80 is sealed by the diaphragm 76.

In the position shown in FIG. 1, fluid flows through the regulator from inlet 18 toward outlet 20 around the seat 32 and through the plunger 52 and outlet 20. Under normal flow pressure conditions, the plunger is biased to the right as viewed in FIG. 1 so that the flow into the plunger 52 is maximized. In the event of a pressure build-up within the line or device downstream of the outlet 20, water will flow through a pair of diametrically opposed grooves 86, around the flanges 60, 62 which are spaced slightly from the internal bore 79 of the downstream section 14, through damper chamber 64, to bear on the piston-like surface 56 and diaphragm 76 in the diaphragm chamber 80. This causes the plunger 52 to move in an upstream direction toward the seat surface 32. The diaphragm 76 also maintains an effective fluidtight seal so that no fluid enters the circular chamber 82 between the plunger 52 and the sleeve 36 in which the spring 72 is located. Chamber 82 is, however, vented to atmosphere by a plurality of notches or grooves 83 (see FIG. 2) in liner 36 and cooperating grooves 85 in the downstream section 14, and, therefore, pressure exerted on piston 56 must not only overcome spring 72, but atmospheric pressure as well.

Depending upon the amount of back pressure developed within the regulator 10, the plunger 52 may be moved rearwardly to the point that the annular edge 52 seats on surface 32 thereby preventing any further flow through the regulator. Upon a subsequent decrease in back pressure, the spring 72, along with atmospheric pressure, will serve to overcome whatever back pressure is present to thereby move the plunger 52 to the right or toward the downstream section of the housing, thereby opening the fluid flow passage between the plunger and the seat 32.

As noted above, a resilient O-ring 66 is seated relatively loosely in the groove or damper chamber 64 as defined by radial flanges 60, 62. More specifically, the O-ring is fitted loosely both on the inner and outer diameters, with approximately 0.010–0.015 clearance. An axial bleed groove 87 is provided in the internal bore 79 of the downstream section 14, communicating between the main flow channel in the regulator and the damper chamber 64. When a pressure surge is experienced by the regulator, the plunger and the O-ring move upstream in the chamber 64, the O-ring expanding outwardly to momentarily seal the entry of water into the diaphragm chamber 80. The above described bleed groove 87 prevents a total hydraulic lock, by allowing a small amount of water to flow out of the damper chamber. Upon a decrease in fluid pressure, the plunger will move away from the plunger seat, causing the O-ring 66 to move in a downstream direction within the damper chamber 64, to momentarily seal against further exit of water out of the damper chamber. In this way, regulation of water into and out of the diaphragm chamber occurs slowly, in a controlled manner, preventing rapid reciprocation of the plunger, and thus eliminating chatter. At the same time, hysteresis is prevented by having the O-ring fit loosely at both the ID and OD once pressure is balanced on either side of the O-ring.

Figure 4:
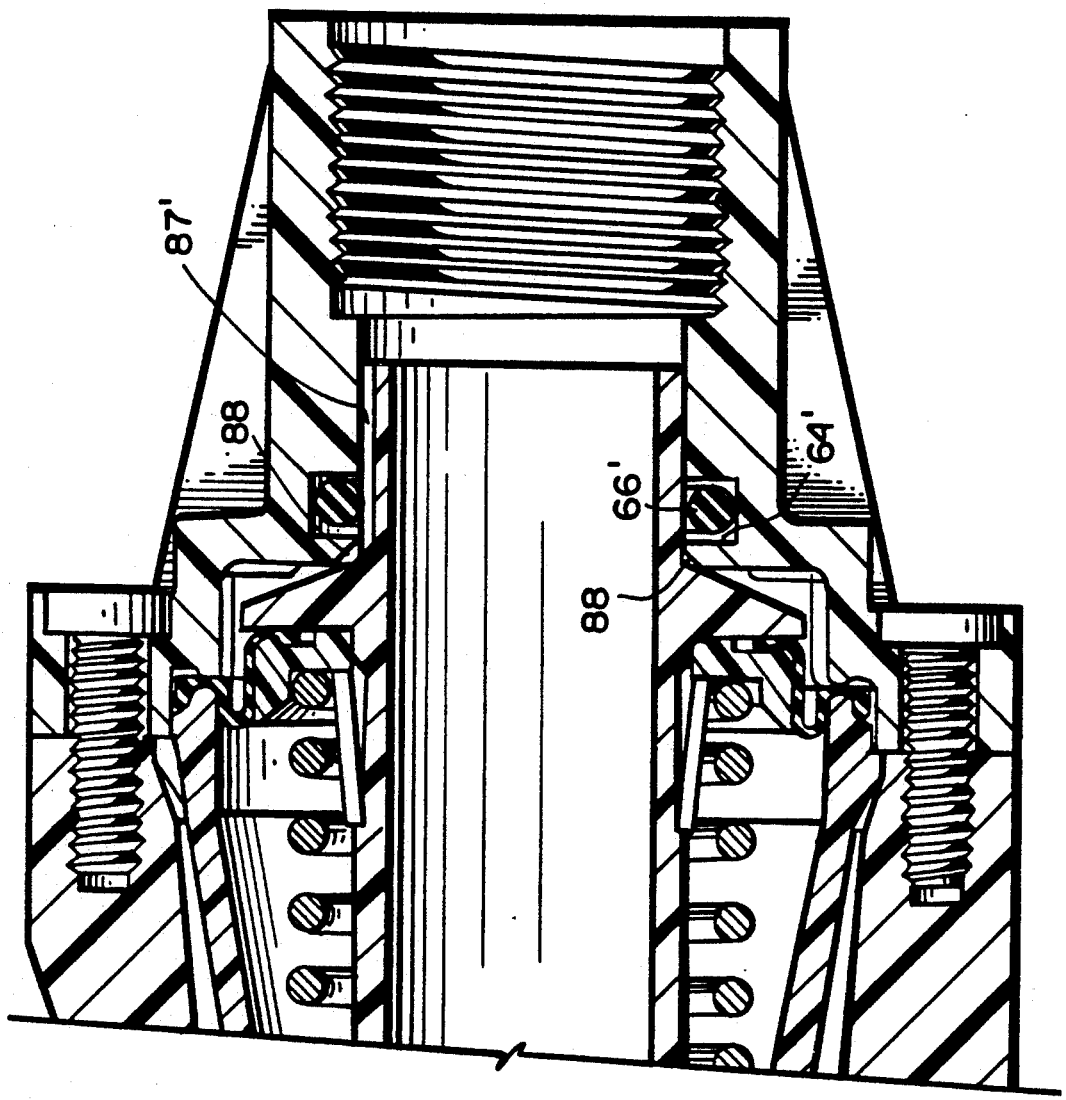
FIG. 4 is a partial cross section of a fluid pressure regulator in accordance with a preferred embodiment of the invention.

Turning to FIG. 4, an alternative and preferred embodiment of the invention is shown in part where the location of the annular groove or damper chamber 64' for receiving O-ring 66' has been moved to the internal wall of the upper section 14' of the regulator housing, and axial bleed groove 87' has been provided on the exterior surface of the plunger 52. Groove 88 is provided to initially permit fluid to enter the diaphragm chamber, when the plunger is biased to its downstream position where piston surface 56 engages the housing section 14. Otherwise, the regulator operates in a substantially identical manner to the regulator illustrated in FIG. 1.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fluid pressure regulator comprising:
   a tubular housing having a fluid inlet at one end thereof and a fluid outlet at an opposite end and a first through passageway therebetween;
   an open-ended tubular plunger mounted for reciprocal movement in said first fluid passage of said housing, said plunger having a flow control end and a piston end, said piston end having a piston surface and a flexible diaphragm extending radially between said piston surface and said housing;
   a seat in said through passageway including a seating surface located axially upstream of said plunger and adapted to be engaged by said flow control end of said plunger; and
   a damper downstream of said piston end of said plunger, said damper including a resilient ring located in a damper chamber communicating with said fluid outlet and a diaphragm chamber located between said diaphragm and said damper chamber.

2. The fluid pressure regulator of claim 1 and including an open-ended tubular sleeve mounted in said housing, one end of said sleeve defining an opening downstream of said seat and through which said plunger slides toward and away from said seat, another end of said sleeve cooperating with said housing to clamp a radially outer end of said diaphragm therebetween.

3. The fluid pressure regulator of claim 2 wherein said damper chamber is defined in part by a pair of radial flanges on said piston end of said plunger, downstream of said piston surface, and wherein said diaphragm chamber extends axially between one of said radial flanges and said diaphragm.

4. The fluid pressure regulator of claim 2 wherein said plunger is spring biased away from said seat by a spring engaged at said piston end of said plunger by a spring retainer, said spring retainer cooperating with said piston surface to clamp a radially inner end of said diaphragm therebetween.

5. The fluid pressure regulator of claim 4 wherein said spring lies radially outwardly of said plunger in a chamber vented to atmosphere.

6. The fluid pressure regulator of claim 2 wherein a bleed groove communicates between said damper chamber and said through passageway at a location downstream of said damper.

7. The fluid pressure regulator of claim 1 wherein said damper chamber is located in said plunger.

8. The fluid pressure regulator of claim 1 wherein said damper chamber is located in said downstream section of said housing.

9. In a fluid pressure regulator comprising a housing having a fluid inlet at one end thereof and a fluid outlet at an opposite end thereof, a plunger slidable in said housing, a seat adjacent one end of said plunger and a diaphragm chamber adjacent the other end of said plunger, said diaphragm chamber being defined in part by said opposite end of said housing, another end of said plunger and a diaphragm connected therebetween, the improvement comprising a damper chamber at the other end of said plunger, said damper chamber including a radially oriented annular groove having a resilient, annular damper element disposed therein for regulating flow into and out of said diaphragm chamber.

10. The improvement of claim 9 wherein said damper chamber is formed in said plunger.

11. The improvement of claim 9 wherein said damper chamber is formed in said housing.

12. The improvement of claims 10 wherein said damper element comprises an O-ring.

13. The improvement of claim 9 and wherein a bleed groove is provided to communicate between said damper chamber and a location in said housing downstream thereof.

14. The improvement of claim 9 wherein said damper chamber is defined by a pair of radially outwardly extending flanges at said another end of said plunger.

15. The improvement of claim 14 wherein a bleed groove is provided to communicate between said damper chamber and a location in said housing downstream thereof.

16. The improvement of claim 9 wherein said plunger is provided with a radially outwardly directed piston surface within said diaphragm chamber.

17. The improvement of claim 9 wherein said plunger is biased in a downstream direction by a coil spring and by atmospheric pressure.

18. A fluid pressure regulator comprising a housing having a first fluid passageway extending through said housing from an inlet end thereof to an outlet end thereof; and annular seat in said housing; a tubular plunger having a flow control end, said plunger adapted to move toward and away from said seat, a variable flow regulating passage being defined by said flow control end and said seat; biasing means for exerting force on said plunger in a direction away from said seat; a diaphragm chamber located toward an end of said plunger opposite said flow control end, said diaphragm chamber adapted to receive fluid under pressure to thereby act on said plunger so as to move said plunger toward said seat as a function of fluid pressure in the outlet end of said housing; a damper chamber downstream of said diaphragm chamber and in fluid communication with said diaphragm chamber and, a resilient damper element within said damper chamber for damping fluid flowing into and out of said diaphragm chamber.

19. The regulator of claim 18 wherein said damper chamber is formed by a pair of radially outwardly directed flanges which slide within a reduced diameter portion of said housing, said flanges sized to permit fluid flow past said flanges.

20. The regulator of claim 19, wherein a bleed groove is formed in said reduced diameter portion of said housing between said damper chamber and said first fluid passageway.

21. The regulator of claim 18 wherein said damper chamber is formed as an annular groove in a reduced diameter portion of said housing downstream of, and in communication with, said diaphragm chamber.

22. The regulator of claim 21 wherein a bleed groove is formed in said plunger, between said damper chamber and said fluid passageway.

23. In a fluid pressure regulator comprising a housing, a plunger slidable in said housing, a seat adjacent one end of said plunger and a diaphragm chamber adjacent the other end of said plunger, said diaphragm chamber being defined in part by said other end of said housing; another end of said plunger and a diaphragm connected therebetween, the improvement comprising a damper chamber at the other end of said plunger, said damper chamber being formed in said housing and having an O-ring disposed in said damper chamber for regulating flow into and out of said diaphragm chamber.

24. In a fluid pressure regulator comprising a housing, a plunger slidable in said housing, a seat adjacent one end of said plunger and a diaphragm chamber adjacent the other end of said plunger, said diaphragm chamber being defined in part by said other end of said housing, another end of said plunger and a diaphragm connected therebetween, the improvement comprising a damper chamber at the other end of said plunger, said damper chamber having a damper element therein for regulating flow into and out of said diaphragm chamber, and wherein a bleed groove is provided to communicate between said damper chamber and a location in said housing downstream thereof.

* * * * *